United States Patent
Lee

(10) Patent No.: US 10,210,546 B2
(45) Date of Patent: Feb. 19, 2019

(54) SYSTEM AND METHOD OF PREVENTING ADDICTION TO ELECTRONIC DEVICE, AND ELECTRONIC DEVICE ADAPTED TO THE SAME

(71) Applicant: Samsung Electronics Co., Ltd., Gyeonggi-do (KR)

(72) Inventor: Yongseok Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 355 days.

(21) Appl. No.: 14/680,622

(22) Filed: Apr. 7, 2015

(65) Prior Publication Data

US 2015/0287089 A1 Oct. 8, 2015

(30) Foreign Application Priority Data

Apr. 7, 2014 (KR) .................. 10-2014-0041429

(51) Int. Cl.
*G06Q 30/02* (2012.01)

(52) U.S. Cl.
CPC ..... *G06Q 30/0267* (2013.01); *G06Q 30/0271* (2013.01)

(58) Field of Classification Search
None
See application file for complete search history.

(56) References Cited

U.S. PATENT DOCUMENTS

| | | | |
|---|---|---|---|
| 2011/0264246 A1* | 10/2011 | Pantoja | G06Q 30/02 700/92 |
| 2014/0272894 A1* | 9/2014 | Grimes | G09B 5/08 434/350 |
| 2015/0052549 A1* | 2/2015 | Teixeira | H04N 21/812 725/32 |

FOREIGN PATENT DOCUMENTS

| | | |
|---|---|---|
| JP | 10-5198646 | 2/2013 |
| KR | 10-1185910 | 9/2012 |
| KR | 10-2013-0062470 | 6/2013 |
| KR | 10-1275648 | 6/2013 |
| KR | 10-2013-0109278 | 10/2013 |
| WO | WO 2013-077567 | 5/2013 |
| WO | WO 2013-085197 | 6/2013 |

OTHER PUBLICATIONS

"In Apps for Mobile Advertising, Brands Pay You to Listen" Published Aug. 15, 2013 at https://www.fastcompany.com/3015692/in-apps-for-mobile-advertising-brands-pay-you-to-listen.*

* cited by examiner

*Primary Examiner* — James M Detweiler
(74) *Attorney, Agent, or Firm* — The Farrell Law Firm, P.C.

(57) ABSTRACT

A method and apparatus are provided of preventing addiction to an electronic device by the electronic device and/or a server. A method includes receiving, by the electronic device, a command to unlock the electronic device; playing an advertisement in response to the unlocking of the electronic device; and transmitting, to the server, subtraction point information based on the playing of the advertisement.

12 Claims, 6 Drawing Sheets

SYSTEM AND METHOD OF PREVENTING ADDICTION TO ELECTRONIC DEVICE, AND ELECTRONIC DEVICE ADAPTED TO THE SAME

PRIORITY

This application claims priority under 35 U.S.C. § 119(a) to Korean Patent Application Serial No. 10-2014-0041429, which was filed in the Korean Intellectual Property Office on Apr. 7, 2014, the entire disclosure of which is incorporated herein by reference.

BACKGROUND OF THE INVENTION

1. Field of the Invention

The present invention relates generally to a system and method of preventing addiction to an electronic device and an electronic device adapted to the method.

2. Description of the Related Art

Due the variety of services being supported by electronic devices, users have become increasingly dependent on the electronic devices.

Often, although users do not have any work to process through their electronic devices, they still absent-mindedly check these devices.

Further, some users are addicted to a specific function of an electronic device, e.g., a game, and spend a lot of time using this specific function.

SUMMARY OF THE INVENTION

The present invention has been made in view of the above-described problems.

Accordingly, an aspect of the present invention is to provide a method and system for preventing addiction to an electronic device.

Another aspect of the present invention is to provide an electronic device adapted to prevent addiction thereto.

In accordance with aspect of the present invention, a method is provided for preventing addiction to an electronic device. The method includes receiving a command to unlock the electronic device; playing an advertisement in response to the unlocking of the electronic device; and transmitting, to a server, subtraction point information based on the playing of the advertisement.

In accordance with another aspect of the present invention, a method is provided for preventing, by a server, addiction to an electronic device. The method includes receiving, from the electronic device, information that a user of the electronic device has set a function for preventing addiction to the electronic device; adding an account for the user of the electronic device to a list of ranking candidates; receiving, from the electronic device, subtraction point information based on playing of an advertisement in the electronic device, after the electronic device is unlocked; updating a score of the account of the user, based on the subtraction point information; and calculating ranking information for the user, based on the updated score.

In accordance with another aspect of the present invention, an electronic device is provided, which includes a display; a transceiver configured to communicate with a server; and a controller configured to receive a command to unlock the electronic device, play an advertisement through the display in response to the unlocking of the electronic device, and transmit, to the server, via the transceiver, subtraction point information, based on the playing of the advertisement.

BRIEF DESCRIPTION OF THE DRAWINGS

The above and other aspects, features, and advantages of certain embodiments of the present invention will become more apparent from the following detailed description, when taken in conjunction with the accompanying drawings, in which.

DETAILED DESCRIPTION OF EMBODIMENTS OF THE INVENTION

Figure 1:
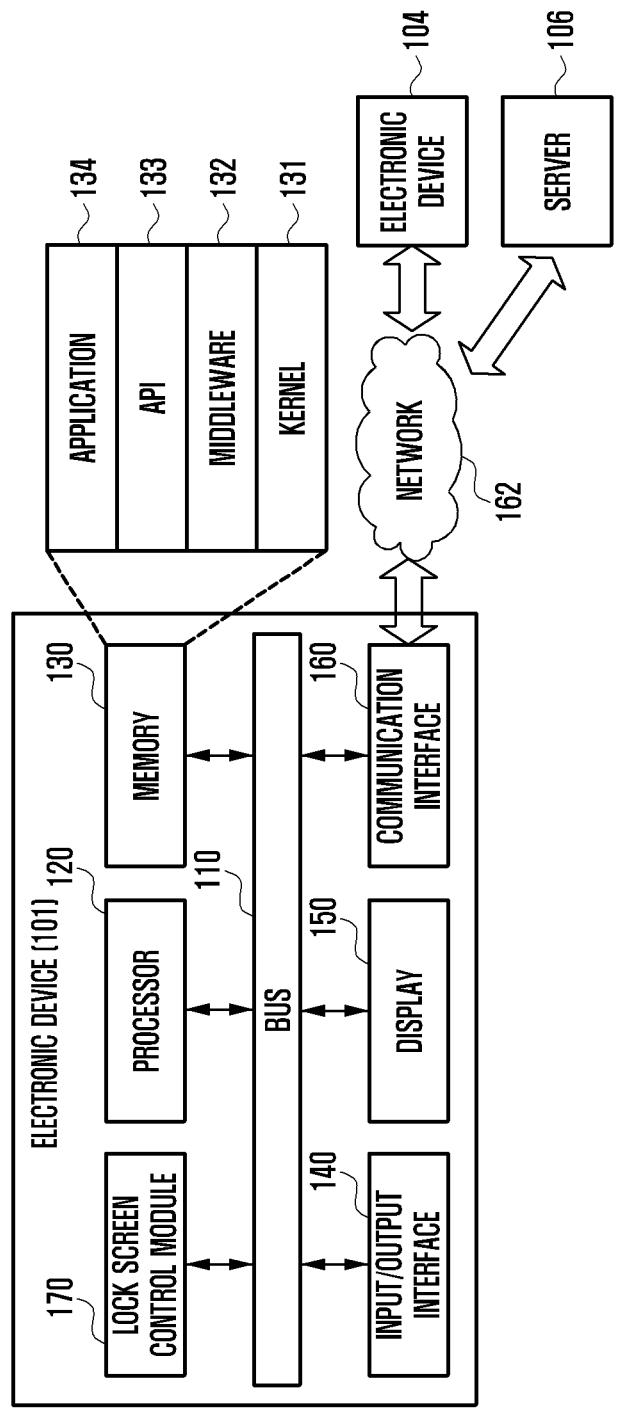
FIG. 1 illustrates a network architecture including the electronic device according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Herein, the expressions "comprises' and may comprise" specify presence of a disclosed function, operation, component, etc., but do not preclude the presence of one or more additional functions, operations, components, etc. Further, the terms "comprises" and/or "has" specify the presence of a stated feature, number, step, operation, component, element, or a combination thereof, but do not preclude the presence or addition of one or more other features, numbers, steps, operations, components, elements, or combinations thereof.

Further, as used herein, terms such as "first," "second," etc., may be used to describe various components, but not to restrict the corresponding components. As the terms are used only for distinguishing one component from another component, the components should not be strictly defined by these terms. For example, a first component may be referred to as a second component and likewise, a second component may also be referred to as a first component, without departing from the teaching of the inventive concept.

Herein, when an element or layer is referred to as being "on", "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present.

Herein, the term "user" may denote a person or a device (e.g., an intelligent electronic device), which uses the electronic device.

The terminology used herein is for the purpose of describing particular embodiments only and is not intended to be limiting of the invention. As used herein, singular forms are intended to include plural forms as well, unless the context clearly indicates otherwise.

Unless otherwise defined, all terms used herein have the same meaning as commonly understood by one of ordinary skill in the art to which the present invention pertains, and should be interpreted neither as having an excessively comprehensive meaning nor as having an excessively contracted meaning. The general terms used herein should be interpreted according to customary dictionary definitions or in the context in which they are used, and should not be interpreted as having an excessively contracted meaning.

In the following description, an electronic device may include at least one of a smartphone, a tablet Personal Computer (PC), a mobile phone, a video phone, an electronic book (ebook) reader, a desktop PC, a laptop PC, a netbook PC, a Personal Digital Assistant (PDA), a Portable Multimedia Player (PMP), an MP3 player, a mobile medical appliance, a camera, a wearable device (e.g. head-mounted-device (HMD) such as electronic glasses), electronic clothing, an electronic bracelet, an electronic necklace, an appcessory, an electronic tattoo, and a smart watch.

Examples of the electronic device may include a smart home appliance, such as a television, a Digital Video Disk (DVD) player, an audio player, a refrigerator, an air conditioner, a cleaner, an oven, a microwave oven, a laundry machine, an air cleaner, a set-top box, a TV box (e.g. Samsung HomeSync®, Apple TV®, and Google TV®), a game console, an electronic dictionary, an electronic key, a camcorder, and an electronic frame.

Examples of the electronic device may also include at least one of a medical appliance (e.g., a Magnetic Resonance An (MRA) device, a Magnetic Resonance Imaging (MRI) device, a Computed Tomography (CT) device, a camera, or an ultrasonic device), a navigation device, a Global Positioning System (GPS) receiver, an Event Data Recorder (EDR), a Flight Data Recorder (FDR), a car infotainment device, an electronic equipment for ship (e.g., a marine navigation device and gyro compass), an avionics device, a security device, a Heads Up Display (HUD), an industrial or home robot, an Automatic Teller Machine (ATM), and a Point Of Sales (POS) device.

Examples of the electronic device may also include furniture or part of building/construction such as an electronic board, an electronic signature receiving device, a projector, and a metering device (e.g., water, electricity, and/or electric wave metering devices).

Further, the electronic device may include a flexible device.

Additionally, the electronic device may include one or any combination of the above-described devices. However, the electronic device is not limited to the above-described devices.

FIG. 1 illustrates a network architecture including an electronic device according to an embodiment of the present invention.

Referring to FIG. 1, the network architecture includes an electronic device 101, an electronic device 104, and a server 106, which communicate through a network 162.

The electronic device 101 includes a bus 110, a processor 120, a memory 130, an input/output interface 140, a display 150, a communication interface 160, and a lock screen control module 170.

The bus 110, which may be a circuitry, connects the aforementioned components to each other, in order to communicate signals (e.g., control messages) therebetween.

The processor 120 receives a command from any of the aforementioned components (e.g., the memory 130, the input/output interface 140, the display 150, the communication interface 160, and the lock screen control module 170) through the bus 110, interprets the command, and executes operation or data processing according to the command.

The memory 130 may store the command or data received from the processor 120 or other components. The memory 130 stores program modules including a kernel 131, middleware 132, an Application Programming Interface (API) 133, and applications 134. The may also store other program modules. Each programming module may be implemented as software, firmware, hardware, and any combination thereof.

The kernel 131 may control or manage system resources (e.g., the bus 110, the processor 120, and the memory 130) for use in executing an operation or function implemented with the middleware 132, the API 133, or the application 134. The kernel 131 may also provide an interface allowing the middleware 132, API 133, or application 134 to access the components of the electronic device 101.

The middleware 132 may work as a relay of data communicated between the API 133 or application 134 and the kernel 131. The middle 132 may execute control of the task requests from the applications 134 to assign priority for use of the system resources of the electronic device to at least one of the applications 134.

The API 133 is the interface for the applications 134 to control the function provided by the kernel 131 or the middleware 132 and may include at least one interface or function (e.g., command) for file control, window control, image control, or text control.

For example, the applications 134 may include a Short Messaging Service/Multimedia Messaging Service (SMS/MMS) application, an email application, a calendar application, an alarm application, a health care application (e.g., an application for measuring a quantity of motion or a blood sugar level), and an environmental information application (e.g., atmospheric pressure, humidity, and temperature applications). The applications 134 may be related to information exchange between the electronic device 101 and other external electronic devices, such as the electronic device 104. Examples of the information exchange application may include a notification relay application for relaying specific information to the external electronic device 104 and a device management application for managing the external electronic device 104.

The notification relay application may be provided with a function of relaying the alarm information generated by the other applications (e.g., the SMS/MMS application, the email application, the health care application, and the environmental information application) of the electronic device 101 to the electronic device 104. The notification relay application may provide the user with the notification information received from the electronic device 104. The electronic device application may manage (e.g., install, delete, and update) a function of the external electronic device 104 (e.g., turn-on/off of the electronic device 104 (or a part of it) or adjustment of the brightness (or resolution) of the display)

which communicates with the electronic device 101 or the service (e.g., communication or messaging service) provided by the external electronic device 104 or an application running on the external electronic device 104.

The applications 134 may also include an application designated according to a property (e.g., a type) of the external electronic device 104. If the external electronic device 104 is an MP3 player, the applications 134 may include a music playback application. Similarly, if the external electronic device is a mobile medical appliance, the applications 134 may include a health care application.

The applications 134 may include an application designated to the electronic device 101 or an application received from the server 106 or the electronic device 104.

The input/output interface 140 delivers a command or data input by the user with an input/output device (e.g., a sensor, a keyboard, and/or a touchscreen) to the processor 120, memory 130, communication interface 160, and/or lock screen control module 170 through the bus 110. For example, the input/output interface 140 may provide the processor 120 with data corresponding to a touch made by the user on the touchscreen. The input/output interface 140 may output the command or data (which is received from the processor 120, memory 130, communication interfaced 160, or the lock screen control module 170 through the bus 110) through the input/output device (e.g., speaker and display). For example, the input/out interface 140 may output voice data processed by the processor 120 to the user through the speaker.

The display 150 presents various information (e.g., multimedia data and text data) to the user.

The communication interface 160 may establish a communication connection of the electronic device 101 with an external device, e.g., the electronic device 104 and the server 106. For example, the communication interface 160 connects to the network 162 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro) and General System for Mobile communications (GSM)).

Examples of the wired communication technology may include Universal Serial Bus (USB), High Definition Multimedia Interface (HDMI), Recommended Standard 232 (RS-232), and Plain Old Telephone Service (POTS).

The network 162 may be a communication network, e.g., a computer network, the Internet, an Internet of Things, and a telephone network.

A communication protocol (e.g., a transport layer protocol, a data link layer protocol, and a physical layer protocol) between the electronic device 101 and an external device may be supported by at least one of the applications 134, the API 133, the middleware 132, the kernel 131, and the communication interface 160.

The lock screen control module 170 controls a lock screen status based on information acquired from the other components, and provides the lock screen status to the user in various methods.

In accordance with an embodiment of the present invention, when a function for preventing addiction to an electronic device is set in the electronic device 101, the server 106 adds a user account associated with the electronic device 101 to a list of ranking candidates, i.e., a ranking of a group of users utilizing the function for preventing addiction to an electronic device, also referred to herein as the rankings. The order of the rankings is based on a user's use of their respective electronic device. For example, a user's ranking is increased, i.e., points, which make up the rankings, are increased, by using the electronic device less than a preset threshold over a preset period (e.g., one week). Further, the points, which make up the rankings, are deducted as the electronic device is used. This raking system is used to provide an incentive, e.g., rewards, to the user's that use their electronic devices the least.

The ranking information may be updated at any time. For example, after a preset period of time, e.g., one week, the ranking information may be automatically calculated in the server 106. A target, e.g., a user of the electronic device 101, who will receive a reward, may be determined based on the overall ranking information. For example, at the end of the week, all users ranked in the top 10%, based on their total points, may receive a reward.

When a period of time to calculate a ranking has expired, the server may initialize the scores of all the accounts.

Further, when the function for preventing addiction to an electronic device is turned off in the electronic device 101, before the period to calculate a ranking has expired, information indicating the turning off of the function is transmitted to the server 106, and the account of the user of the electronic device 101 may be removed from the rankings.

Figure 2:
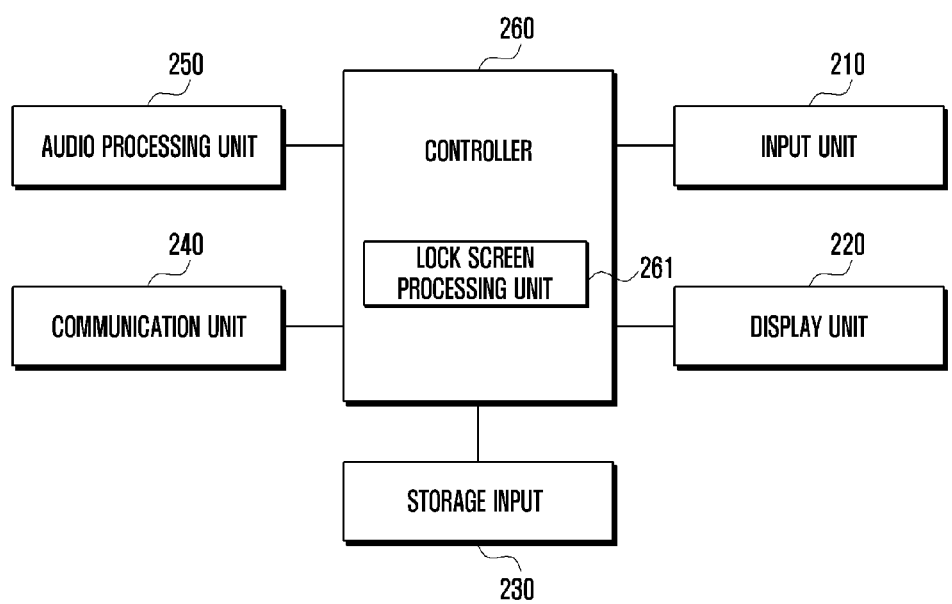
FIG. 2 illustrates an electronic device according to an embodiment of the present invention.

FIG. 2 illustrates an electronic device according to an embodiment of the present invention.

Referring to FIG. 2, the electronic device includes an input unit 210, a display unit 220, a storage unit 230, a communication unit 240, an audio processing unit 250, and a controller 260, which includes a lock screen processing unit 261.

The input unit 210 receives a variety of input events, such as a user key input pr touch, etc., during the operation of the electronic device, and transmits the signals corresponding to the input events to the controller 260. For example, the input unit 210 includes a touch panel, an external key pad/keyboard, various types of sensors, e.g., a sensor for detecting shaking of the electronic device, etc.

Specifically, the input unit 210 may receive user input to unlock a locked screen, and to skip advertisements that are showing, after an electronic device is unlocked. The input unit 210 may receive user inputs in various forms and transfers signals corresponding to the inputs to the controller 260.

The display unit 220 displays screens under the control of the controller 260. When a function for preventing addiction to the electronic device is operating, the display unit 220 may display a locked screen. When the electronic device is unlocked, the display unit 220 displays an advertisement for a preset period of time. While the display unit 220 is playing the advertisement, it may stop playing the advertisement in response to a user input and may then display a default background screen. Further, the display unit 220 may display ranking information about a number of unlocking operations and reward information, such as information about whether the user may receive a reward.

The storage unit 230 stores data and various types of programs for operating the electronic device. In accordance with an embodiment of the present invention, the storage unit 230 stores data and a program related to a function for preventing addiction to the electronic device.

Further, the storage unit 230 may store data about advertisements to be displayed after the electronic device is unlocked, while the function for preventing addiction to the electronic device is operating.

The storage unit 230 may also store a program for display information about rewards.

The communication unit 240 supports communication of the electronic device in a wired or wireless mode, e.g., to perform Internet access, transmission/reception of text messages, short range wireless pairing process, etc. While a function for preventing addiction to the electronic device is operating, the communication unit 240 may receive, from a server, advertisements that will be displayed on the screen, when the electronic device is unlocked.

For example, the advertisements may include multimedia data, such as images, texts, videos, etc.

As a part of the reward structure, the communication unit 240 may transmit subtraction point information to the server, such that points that are used to determine a ranking can be reduced each time the electronic device is unlocked. Also, the communication unit 240 may transmit subtraction point information to the server, such that the points that are used to determine a ranking can be reduced each time an advertisement is skipped. For example, the number of points reduced when the user skips may be more than when the electronic device is unlocked and the advertisement is watched, as an incentive for the user to watch the advertisement.

The communication unit 240 may receive information on an overall ranking, created at preset periods, from the server, in order to provide the overall ranking information to the user. The communication unit 240 may also receive reward information, based on the rankings, from the server.

The audio processing unit 250 provides functions for inputting and outputting various audio data of the electronic device. The audio processing unit 250 may include, for example, a microphone, a speaker, etc., and may process functions related to audio.

The audio processing unit 250 may also process audio of an advertisement, which is displayed when the electronic device is unlocked. In addition, the audio processing unit 250 may support a function of outputting additional audio data, when a function for preventing addiction to the electronic device is operated.

In addition, the audio processing unit 250 may minimize or remove sound of a message reception notification, a push notification, etc., automatically notified when a function for preventing addiction to electronic device is set, so that the use frequency of the electronic device by the user can be reduced.

The controller 260 controls the entire operation of the electronic device. When a function for preventing addiction to the electronic device is set, the controller 260 performs a control operation to display an advertisement on the screen, after the electronic device is unlocked, i.e., after a lock screen is released.

When the electronic device is unlocked and an advertisement screen is displayed, the controller 260 may transmit subtraction point information to the server, in order for the server to deduct points from a ranking corresponding to the user of the electronic device.

In addition, the controller 260 may identify when the user skips the advertisement, according to a user's request, and transmit additional subtraction point information to the server. In order to encourage the user to view an advertisement, the number of points reduced when the user skips may be more than when the electronic device is unlocked and the advertisement is watched.

The controller 260 may also receive overall ranking information from the server through the communication unit 240 and perform a control operation to display the overall rankings.

Further, the controller 260 may receive and control the display of reward payment-related information from the server.

Figure 3:
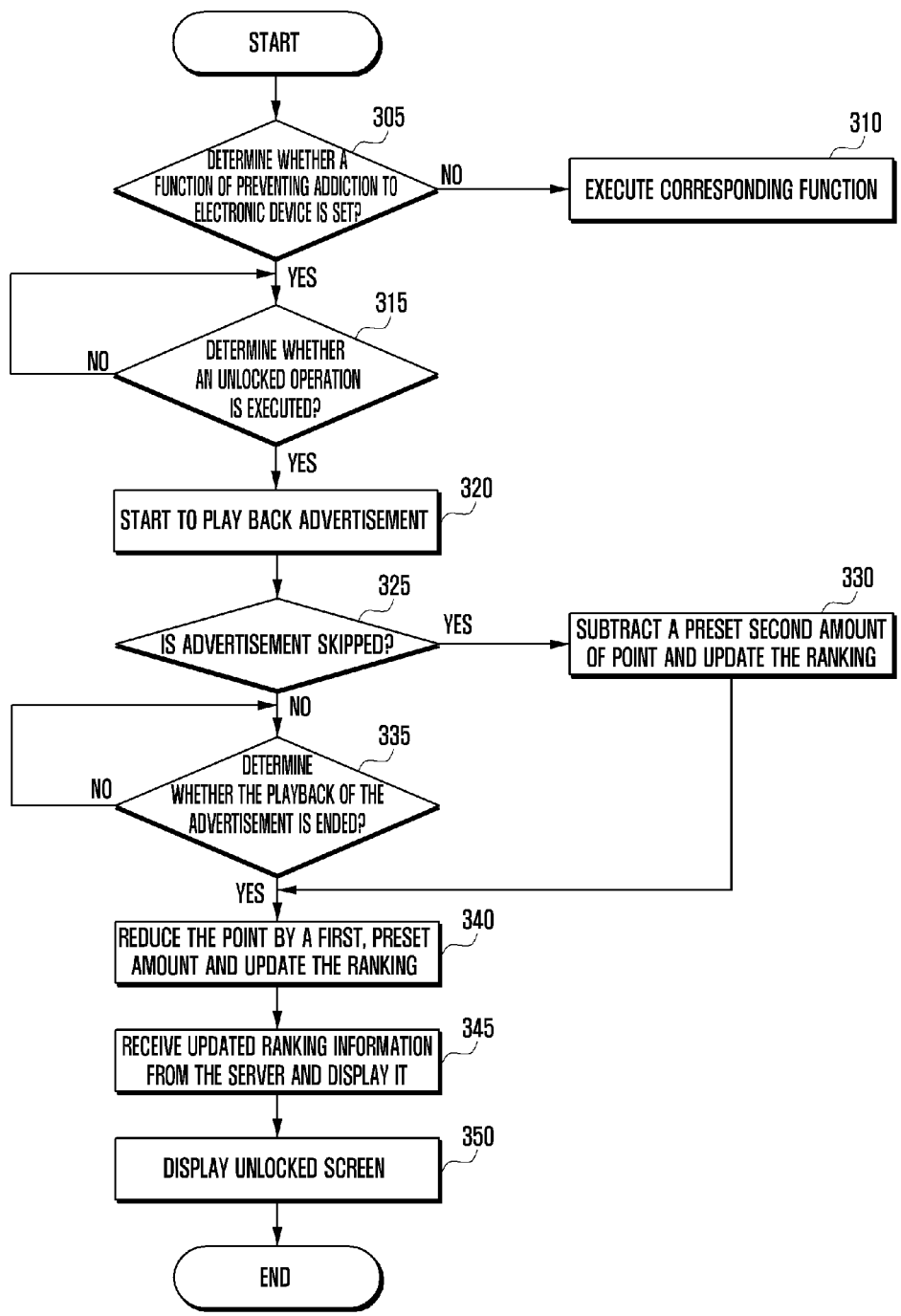
FIG. 3 is a flow chart illustrating a method of an electronic device according to an embodiment of the present invention.

FIG. 3 is a flow chart illustrating a method for preventing addiction to an electronic device according to an embodiment of the present invention.

Referring to FIG. 3, in strep 305, the electronic device, currently in a locked state, determines whether a function for preventing addiction to the electronic device is set. When the function for preventing addiction to electronic device is not set, the electronic device executes an operation of a corresponding function in step 310. For example, when the function for preventing addiction to electronic device is not set, the electronic device displays an idle screen of a locked state.

However, when the function for preventing addiction to the electronic device is set in step 305, the electronic device determines whether an unlocking operation is executed in step 315. In order to unlock the electronic device, i.e., release the locked screen, well-known unlocking methods may be employed, e.g., a password inputting, a pattern password inputting, a fingerprint recognition, a facial recognition, etc.

When the electronic device is unlocked in step 315, the electronic device plays an advertisement in step 320. The advertisement may be designed in such a way that it is played back for a preset period of time, which makes it in convenient for the user to unnecessarily use the electronic device. For example, the period of time for playing the advertisement may be set to 13, 15, or 17 seconds, etc. If an advertisement is designed as a video of an 8-second-playback time, it may be repeatedly played back for a preset period of time.

However, if the user does not want to view the advertisement, the user may skip the playback.

In step 325, the electronic device determines whether a user request is input to skip the advertisement in playback. For example, if the electronic device detects that a 'Skip' button on the advertisement screen is selected, the electronic device recognizes the event as a request to skip the advertisement.

When the user skips the advertisement in step 325, the electronic device transmits point subtraction information to the server in step 330, in order for a preset amount of points can be reduced from a ranking of the user. As described above, In order to encourage the user to view the advertisement, the number of points reduced when the user skips the advertisement may be more than when the electronic device is unlocked and the advertisement is watched.

However, when the user does not skip the advertisement in step 325, the electronic device determines whether the playback of the advertisement is ended in step 335.

When the electronic device ascertains that the playback of the advertisement is ended in step 335, the electronic device transmits subtraction information to the server in step 340, in order to reduce the user's ranking accordingly.

In step 345, the electronic device receives, from the server, ranking information, updated based on the subtraction information, and displays the ranking information on the screen. Step 345 may be performed automatically, in response to a user command, periodically, and/or each time the electronic device is unlocked.

In step 350, the electronic device displays an unlocked screen.

Figure 4:
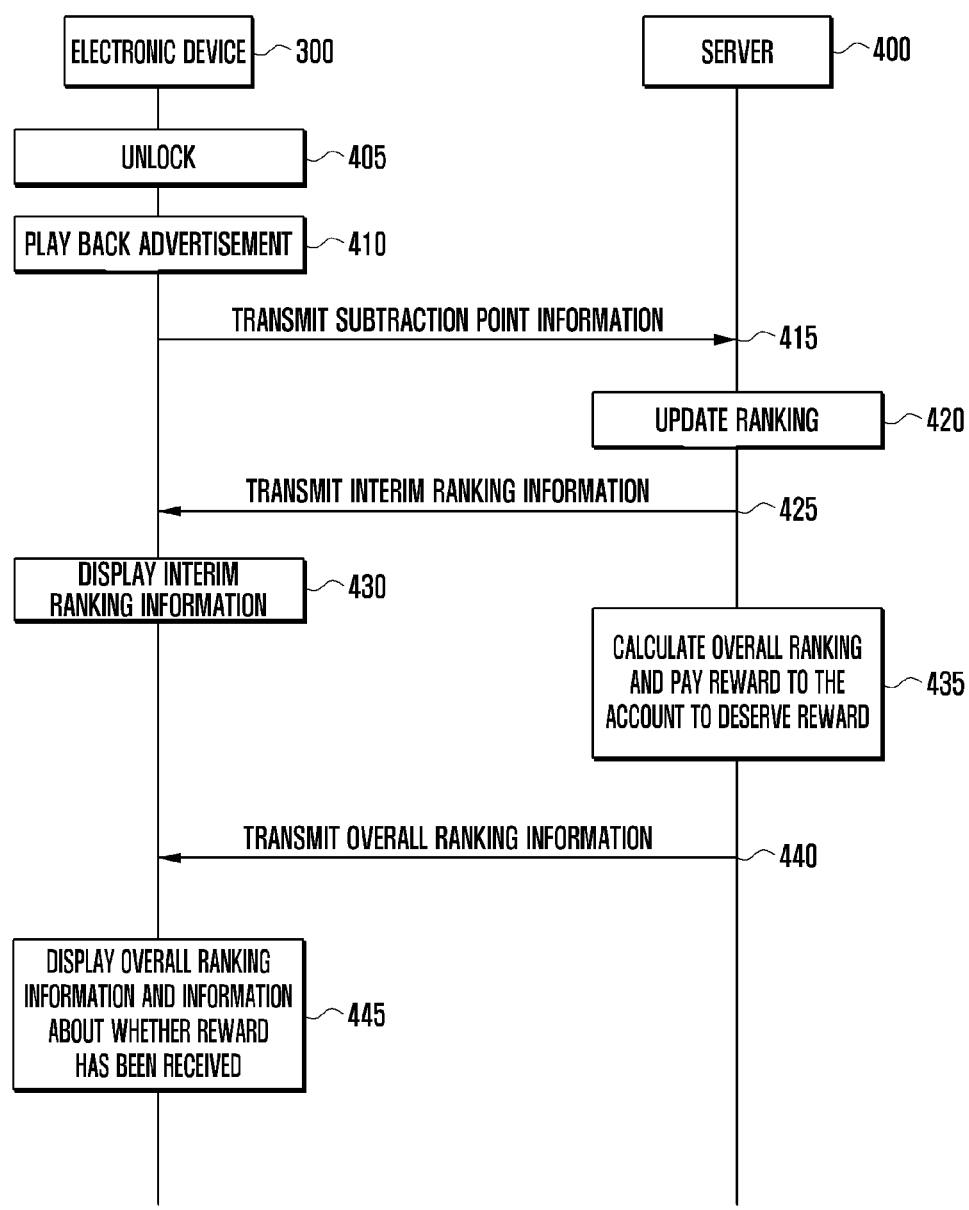
FIG. 4 is a signal flow diagram illustrating a method of preventing addiction to an electronic device according to an embodiment of the present invention.

FIG. 4 is a signal flow diagram illustrating a method for preventing addiction to an electronic device according to an embodiment of the present invention. Specifically, FIG. 4 illustrates a method based on communication between an electronic device 300 and a server 400.

Referring to FIG. 4, the electronic device 300 is unlocked in step 405 and plays an advertisement in step 410.

In step 415, the electronic device 300 transmits point subtraction information, created as the advertisement is played back, to the server 400. The point subtraction information transmitted in step 415 may include point subtraction information created after an advertisement is played back and/or point subtraction information created when the advertisement is skipped.

In step 420, the server 400 updates ranking information, based on the received point subtraction information.

As described above, the ranking is based on points rewarded and subtracted based on a user's use of an electronic device. To this end, the server 400 determines the rankings of addiction overcoming for the user accounts, based on their respective points.

When a user unlocks his electronic device, the server 400 deducts a point or points from the user's account score. As described above, when an unlocking operation has been made and an advertisement is played, the server 400 may impose a penalty on the account when the user skips the advertisement. In addition, when a user turns off the function for preventing addiction to the electronic device, the user's account may be removed from the rankings.

Although the rankings calculating time period has not elapsed, the server 400 may continue to update the rankings step 420.

In step 425, the server 400 transmits the interim ranking information to the electronic device 300. For example, the occasionally updated ranking information may be transmitted from the server 400 to the electronic device 300 at a certain period, or according to a user request.

In step 430, the electronic device 200 displays the interim ranking information.

When the rankings calculating time period (e.g., one week) has elapsed, in step 435, the server 400 calculates the overall rankings and pays a reward to the accounts that deserve rewards.

In step 440, the server 400 transmits the overall ranking information and reward information to the electronic device 300.

In step 445, the electronic device 300 displays the overall ranking information and reward information.

The reward to the user of the electronic device 300 may be part of the advertisement rate from the advertiser to the service provider of the server 400. That is, the service provider of the server 400 provides advertisements to the users who set the function for preventing addiction to an electronic device in their respective electronic devices, such that the advertiser benefits from the users viewing the advertisements.

Additionally, the service provider of the server 400 may give part of the benefit from the advertisers, as a reward, to users who have released a lock state the fewest number of times.

In summary, when a user trying to overcome an addiction of electronic devices configures the addiction prevention function, the user is motivated to decrease their use of the electronic device due to the inconvenience of viewing advertisements, whenever the electronic device is used, and in exchange for receiving rewards.

For example, the rewards provided to the users can be a portion of the advertisement fee the server administrator receives from the advertisers.

In addition, the advertisers may provide advertisement fees corresponding to the number of users who have configured the addiction prevention function to the server administrator because the function allows users to view advertisements every time the electronic device is used.

It should be understood that the present invention is not limited to the ranking calculating methods described above.

For example, when an electronic device detects that a preset application (e.g., a game application) is executed, it may transmit point subtraction information to the server.

In addition, the extent of subtraction point, a period of time to calculate the order of rankings, a reward standard, etc., may be set in a variety of conditions.

It should be understood that users eligible for rewards may receive a reward in a variety of methods. For example, users may receive a reward, through their accounts, such as mobile money, mobile coupons, etc., which are available online.

Figure 5:
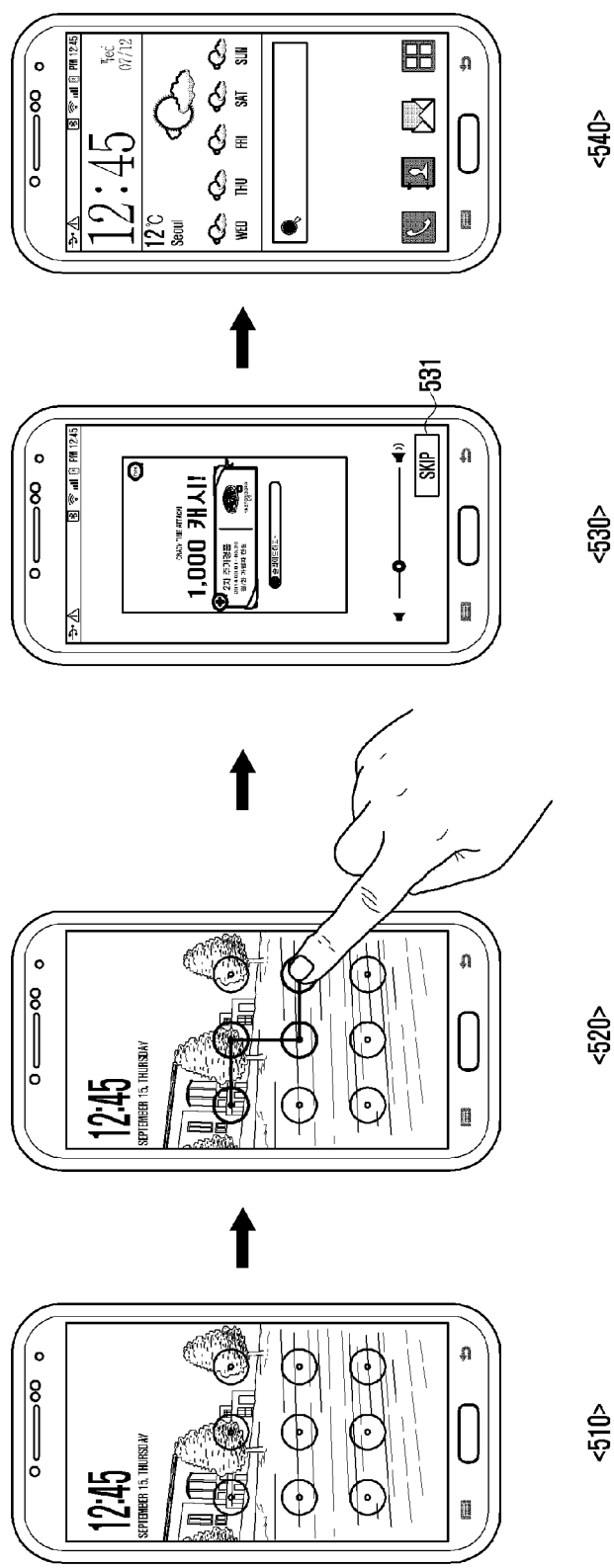
FIG. 5 illustrates examples of screen images for preventing addiction to an electronic device according to an embodiment of the present invention.

FIG. 5 illustrates examples of screen images for preventing addiction to an electronic device according to an embodiment of the present invention.

Referring to FIG. 5, as illustrated in diagram 510, the electronic device displays a lock screen.

As illustrated in diagram 520, a user password pattern is applied to the lock screen in order to unlock the electronic device. In addition to the pattern recognition method, the present invention may also employ various types of authentications, such as password recognition, voice recognition, fingerprint recognition, facial recognition, etc.

When the electronic device is unlocked, the electronic device plays an advertisement, as illustrated in diagram 530. As described above, the advertisement may be skipped by the user, e.g., by pressing a 'Skip' button 531. When the advertisement is skipped by clicking the 'Skip' button 531, the electronic device displays a normal operating screen, as illustrated in diagram 540.

Figure 6:
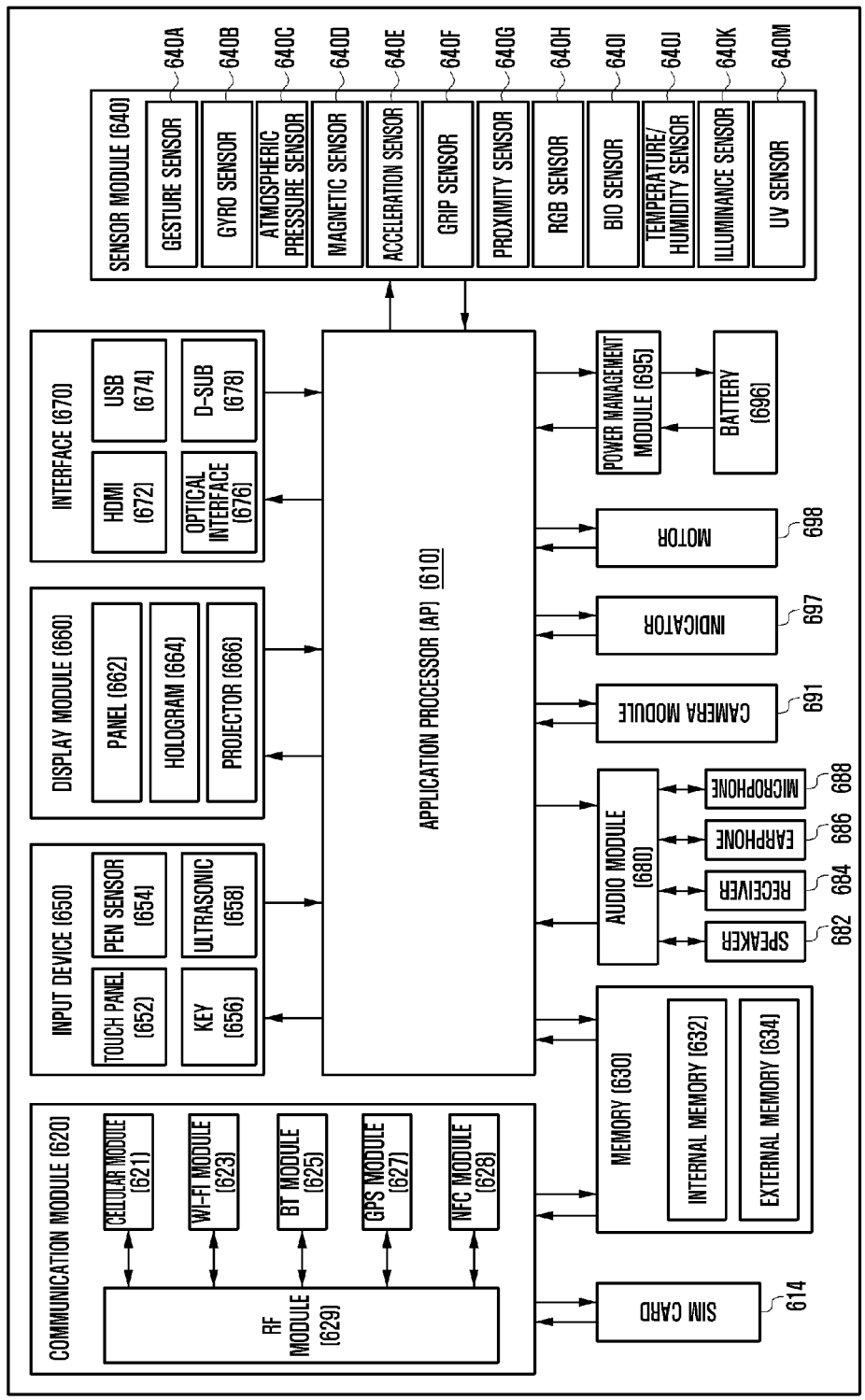
FIG. 6 illustrates an electronic device according to an embodiment of the present invention.

FIG. 6 illustrates an electronic device according to an embodiment of the present invention.

Referring to FIG. 6, the electronic device includes an Application Processor (AP) 610, a communication module 620, a Subscriber Identifier Module (SIM) card 614, a memory 630, a sensor module 640, an input device 650, a display 660, an interface 670, an audio module 680, a camera module 691, a power management module 695, a battery 696, an indicator 697, and a motor 698.

The AP 610 controls a plurality of hardware or software components connected to the AP 610 by driving an operating system or an application program and process various data including multimedia data and perform calculations. The AP 610 may be implemented by, for example, a System on Chip (SoC). The AP 610 may further include a Graphic Processing Unit (GPU).

The communication module 620 performs data transmission/reception in a communication between the electronic device and other electronic devices (e.g., the electronic device 104 and the server 106, as illustrated in FIG. 1) connected thereto through a network. The communication module 620 includes a cellular module 621, a Wi-Fi module 623, a BT module 625, a GPS module 627, an NFC module 628, and a Radio Frequency (RF) module 629.

The cellular module 621 provides a voice call, a video call, an SMS, or an Internet service through a communication network (e.g., LTE, LTE-A, CDMA, WCDMA, UMTS, WiBro, OR GSM). Further, the cellular module 621 may distinguish and authenticate electronic devices within a communication network using, for example, a subscriber identification module (for example, the SIM card 614). The cellular module 621 may perform at least a part of functions that may be provided by the AP 610. For example, the cellular module 621 may perform at least some of the multimedia control functions.

The cellular module 621 may include a Communication Processor (CP). Further, the cellular module 621 may be implemented by, for example, an SoC. Although the elements such as the cellular module 621 (e.g., a communication processor), the memory 630, and the power management module 695 are illustrated to be separate from the AP 610 in FIG. 6, the AP 610 may include at least some of the aforementioned elements (e.g., the cellular module 621).

The AP 610 or the cellular module 621 (e.g., a communication processor) may load a command or data received from at least one of a non-volatile memory and other elements connected thereto in a volatile memory, and may process the loaded command or data. Further, the AP 610 or the cellular module 621 may store data received from or generated by at least one of other elements in a non-volatile memory.

The Wi-Fi module 623, the BT module 625, the GPS module 627, and the NFC module 628 may include, for example, a processor for processing data transmitted/received through the corresponding module. Although the cellular module 621, the Wi-Fi module 623, the BT module 625, the GPS module 627, and the NFC module 628 are illustrated as separate blocks in FIG. 6, at least some (for example, two or more) of the cellular module 621, the WiFi module 623, the BT module 625, the GPS module 627, and the NFC module 628 may be included in one Integrated Chip (IC) or one IC package according to an embodiment. For example, at least some (e.g., the communication processor corresponding to the cellular module 621 and the Wi-Fi processor corresponding to the Wi-Fi module 623) of the processors corresponding to the cellular module 625, the Wi-Fi module 627, the BT module 628, the GPS module 621, and the NFC module 623 may be implemented by one SoC.

The RF module 629 may transmit/receive data, for example, an RF signal. Although not illustrated, the RF module 629 may include, for example, a transceiver, a Power Amplifier Module (PAM), a frequency filter, a Low Noise Amplifier (LNA), etc. Further, the RF module 629 may further include a component for transmitting and receiving electromagnetic waves in a free space in a wireless communication, for example, a conductor, a conductive wire, or the like.

Although the cellular module 621, the Wi-Fi module 623, the BT module 625, the GPS module 627, and the NFC module 628 share one RF module 629 in FIG. 6, at least one of the cellular module 621, the Wi-Fi module 623, the BT module 625, the GPS module 627, and the NFC module 628 may transmit/receive an RF signal through a separate RF module according to an embodiment.

The SIM card 614 includes a subscriber identification module, and is inserted into a slot formed in a particular portion of the electronic device. The SIM card 614 may include unique identification information (for example, an Integrated Circuit Card IDentifier (ICCID)) or subscriber information (for example, an International Mobile Subscriber Identity (IMSI)).

The memory 630 (e.g., the memory 130) includes an internal memory 632 and an external memory 634. The internal memory 632 may include, for example, at least one of a volatile memory (e.g., a Dynamic RAM (DRAM), a Static RAM (SRAM), a Synchronous Dynamic RAM (SDRAM), and the like), and a non-volatile Memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, and the like).

The internal memory 632 may be a Solid State Drive (SSD). The external memory 634 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 634 may be functionally connected with the electronic device 601 through various interfaces. The electronic device 601 may further include a storage device (or storage medium) such as a hard drive.

The sensor module 640 measures a physical quantity or detects an operation state of the electronic device 601, and converts the measured or detected information to an electronic signal. The sensor module 640 includes, for example, a gesture sensor 640A, a gyro sensor 640B, an atmospheric pressure sensor 640C, a magnetic sensor 640D, an acceleration sensor 640E, a grip sensor 640F, a proximity sensor 640G, a color sensor 640H (for example, red, green, and blue (RGB) sensor), a bio-sensor 640I, a temperature/humidity sensor 640J, an illumination sensor 640K, and a Ultra Violet (UV) sensor 640M.

Additionally or alternatively, the sensor module 640 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, etc.

The sensor module 640 may further include a control circuit for controlling one or more sensors included therein.

The input device 650 includes a touch panel 652, a (digital) pen sensor 654, a key 656, or an ultrasonic input device 658. The touch panel 652 may recognize a touch input through at least one of a capacitive type, a resistive type, an infrared type, and an ultrasonic wave type. The touch panel 652 may further include a control circuit. The capacitive type touch panel may recognize a physical contact or a proximity. The touch panel 652 may further include a tactile layer. In this case, the touch panel 652 may provide a tactile reaction to the user.

The (digital) pen sensor 654 may be implemented, for example, using a method identical or similar to a method of receiving a touch input of the user, or using a separate recognition sheet. The key 656 may include, for example, a physical button, an optical key, or a keypad. The ultrasonic input device 658 may identify data by detecting an acoustic wave with a microphone (e.g., a microphone 688) of the electronic device 601 through an input unit generating an ultrasonic signal, and may perform a wireless recognition. The electronic device 601 may receive a user input from an external device (for example, a computer or a server) connected thereto using the communication module 620.

The display 660 includes a panel 662, a hologram device 664, or a projector 666. The panel 662 may be, for example, a Liquid Crystal Display (LCD) or an Active Matrix Organic Light Emitting Diode (AM-OLED). The panel 662 may be implemented to be, for example, flexible, transparent, or wearable. The panel 662 may be configured by the touch panel 652 and one module. The hologram 664 may show a stereoscopic image in the air using an interference of light. The projector 666 may project light onto a screen to display an image. The screen may be located, for example, an inside or an outside the electronic device 601. The display 660 may further include a control circuit for controlling the panel 662, the hologram device 664, or the projector 666.

The interface 670 includes, for example, a High-Definition Multimedia Interface (HDMI) 672, a Universal Serial Bus (USB) 674, an optical interface 676, or a D-subminiature (D-sub) 678. Additionally or alternatively, the interface 670 may include, for example, a Mobile High-definition Link (MHL) interface, a Secure Digital (SD) card/Multi-Media Card (MMC) interface, or an Infrared Data Association (IrDA) standard interface.

The audio module 680 may bilaterally convert a sound and an electronic signal. The audio module 680 may process sound information input or output through, for example, the speaker 686, the receiver 684, the earphones 686, the microphone 688 or the like.

The camera module 691 is a device for capturing a still image or a video, and according to an embodiment, may include one or more image sensors (e.g., a front sensor or a rear sensor), a lens, an Image Signal Processor (ISP), or a flash (e.g., an LED or a xenon lamp).

The power managing module 695 may manage power of the electronic device 601. The power management module 695 may include, for example, a Power Management Integrated Circuit (PMIC), a charger Integrated Circuit (IC), or a battery or fuel gauge.

The PMIC may be mounted to, for example, an integrated circuit or an SoC semiconductor. Charging methods may be classified into a wired charging method and a wireless charging method. The charger IC may charge a battery and prevent an over voltage or an over current from being flowed from a charger. The charger IC may include a charger IC for at least one of the wired charging method and the wireless charging method. A magnetic resonance scheme, a magnetic induction scheme, or an electromagnetic scheme may be exemplified as the wireless charging method, and an additional circuit for a wireless charging, such as a coil loop circuit, a resonance circuit, a rectifier circuit, and the like may be added.

The battery gauge may measure, for example, a remaining quantity of the battery 696, or a voltage, a current, or a temperature during the charging. The battery 696 may store or generate electricity, and may supply power to the electronic device 601 using the stored or generated electricity. The battery 696 may include, for example, a rechargeable battery or a solar battery.

The indicator 697 may display a specific status of the electronic device 601 or a part (e.g., the AP 610) of electronic device, for example, a booting status, a message status, a charging status, and the like. The motor 698 may convert an electrical signal to a mechanical vibration. Although not illustrated, the electronic device 601 may include a processing unit (e.g., a GPU) for supporting a mobile TV. The processing device for supporting the mobile TV may process, for example, media data according to a standard of Digital Multimedia Broadcasting (DMB), Digital Video Broadcasting (DVB), media flow or the like.

Each of the described component elements of the hardware according to the present invention may be formed of one or more components, and a name of a corresponding component element may be changed based on a type of an electronic device. The electronic device according to the present disclosure may include one or more of the aforementioned components or may further include other additional components, or some of the aforementioned components may be omitted.

Further, some of the components of the electronic device according to the various embodiments of the present disclosure may be combined to form a single entity, and thus, may equivalently execute functions of the corresponding elements prior to the combination.

The term "module" used herein may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future.

According to various embodiments, at least a part of a device (for example, modules or functions thereof) or a method (for example, operations) according to the present disclosure may be implemented by, for example, an instruction stored in a computer-readable storage medium provided in a form of a programming module. When the instruction is executed by one or more processors, the one or more processors may perform a function corresponding to the command.

The computer-readable storage medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, a programming module), such as a Read Only Memory (ROM), a Random Access Memory (RAM), a flash memory and the like. Further, the program instruction may include high class language codes, which can be executed in a computer by using an interpreter, as well as machine codes made by a compiler. The aforementioned hardware device may be configured to operate as one or more software modules in order to perform the operation of the present disclosure, and vice versa The programming module according to the present disclosure may include one or more of the aforementioned components or may further include other additional components, or some of the aforementioned components may be omitted. Operations executed by a module, a programming module, or other components according to the present disclosure may be executed sequentially, in parallel, repeatedly, or in a heuristic manner. Further, some operations may be executed according to another order or may be omitted, or other operations may be added.

As described above, a method and system according to various embodiments of the present invention can assist users who are addicted to using their electronic devices to reduce use of their electronic devices. Since the embodiments of the present invention rank users based low frequency of use and pay rewards to the users having the highest ranking accounts, users are encouraged to reduce the number of times they user their electronic devices.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of preventing addiction to an electronic device, by an electronic device with a function for preventing addition executing thereon, the method comprising:
   detecting, by at least one processor of the electronic device, that the electronic device is unlocked a first time via a first unlocking operation;
   playing, by the at least one processor of the electronic device and in response to the detection that the electronic device is unlocked the first time, a first advertisement corresponding to the function for preventing addiction;
   determining, by the at least one processor of the electronic device, that playing of the first advertisement is complete;
   transmitting, by the at least one processor of the electronic device and in response to the determination that playing of the first advertisement is complete, first subtraction point information to a server, wherein the first subtraction point information identifies a first preset number of points to be subtracted from ranking information;
   detecting, by the at least one processor of the electronic device, that the electronic device is unlocked a second time via a second unlocking operation;
   playing, by the at least one processor of the electronic device and in response to the detection that the electronic device is unlocked the second time, a second advertisement corresponding to the function for preventing addiction;
   determining, by the at least one processor of the electronic device, that an input to skip playing of the second advertisement is received;
   transmitting, by the at least one processor of the electronic device and in response to the determination that the input to skip playing of the second advertisement is received, second subtraction point information to the server, wherein the second subtraction point information identifies to a second preset number of points to be subtracted from ranking information, wherein the second preset number of points is greater than the first preset number of points; and
   updating, by the server, the ranking information based on the first subtraction point information and the second subtraction point information.

2. The method of claim 1, further comprising:
   receiving, by the at least one processor of the electronic device and from the server, the ranking information, updated based on the first subtraction point information and the second subtraction point information; and
   displaying, by the at least one processor of the electronic device, the ranking information.

3. The method of claim 2, further comprising:
   receiving, by the at least one processor of the electronic device and from the server, overall ranking information calculated based on the ranking information corresponding to the electronic device and another ranking information corresponding to another electronic device; and
   displaying, by the at least one processor of the electronic device, the overall ranking information.

4. The method of claim 2, wherein displaying the ranking information comprises one of:
   displaying, by the at least one processor of the electronic device, the ranking information on a display of the electronic device for a certain period:
   displaying, by the at least one processor of the electronic device, the ranking information on the display of the electronic device, in response to a user request; and
   displaying, by the at least one processor of the electronic device, the ranking information on the display of the electronic device, after unlocking the electronic device.

5. The method of claim 1, further comprising skipping, by the one or more processors, a remaining portion of an advertisement being played in response to a user skip command.

6. The method of claim 1, further comprising:
   receiving, by the at least one processor of the electronic device, a setting of the function for preventing the addiction to the electronic device; and
   automatically altering, by the at least one processor of the electronic device, a notification function of the electronic device, in response to the setting.

7. An electronic device with a function for preventing addition executing thereon comprising:
   a display;
   a transceiver configured to communicate with a server;
   one or more processors; and
   one or more computer storage media storing computer-useable instructions that, when executed by the one or more processors, cause the one or more processors to perform operations comprising:
   detect that the electronic device is unlocked a first time via a first unlocking operation,
   play, in response to the detection that the electronic device is unlocked the first time, a first advertisement corresponding to the function for preventing addiction through the display,
   determine that playing of the first advertisement is complete,
   transmit, via the transceiver and in response to the determination that playing of the first advertisement is complete, first subtraction point information to a server, wherein the first subtraction point information identifies to a first preset number of points to be subtracted from ranking information,
   detect that the electronic device is unlocked a second time via a second unlocking operation,
   play, in response to the detection that the electronic device is unlocked the second time, a second advertisement corresponding to the function for preventing addiction,
   determine, that an input to skip playing of the second advertisement is received, and
   transmit, via the transceiver in response to the determination that the input to skip the playing of the second advertisement is received, second subtraction point information to the server, wherein the second subtraction point information identifies to a second preset number of points to be subtracted from ranking information, wherein the second preset number of points is greater than the first preset number of points.

8. The electronic device of claim 7, wherein the instructions, when executed by the one or more processors, further cause the one or more processors to perform operations comprising:

receive, from the server, via the transceiver, the ranking information, updated based on the first subtraction point information and the second subtraction point information, and display the ranking information through the display.

9. The electronic device of claim 8, wherein the instructions, when executed by the one or more processors, further cause the one or more processors to perform operations comprising:

receive, from the server, via the transceiver, overall ranking information for addiction calculated based on the ranking information corresponding to the electronic device and another ranking information corresponding to another electronic device, and display the overall ranking information for addiction through the display.

10. The electronic device of claim 8, wherein the instructions, when executed by the one or more processors, further cause the one or more processors to perform operations comprising:

displaying the ranking information on the display of the electronic device for a certain period;

displaying the ranking information on the display of the electronic device, in response to a user request; and displaying the ranking information on the display of the electronic device, after unlocking the electronic device.

11. The electronic device of claim 7, wherein the instructions, when executed by the one or more processors, further cause the one or more processors to skip a remaining portion of an advertisement being played in response to a user skip command.

12. The electronic device of claim 7, wherein the instructions, when executed by the one or more processors, further cause the one or more processors to perform operations comprising:

receive a setting of the function for preventing the addiction to the electronic device, and automatically alter a notification function of the electronic device, in response to the setting.

* * * * *